US006467913B1

(12) United States Patent
Holden et al.

(10) Patent No.: US 6,467,913 B1
(45) Date of Patent: Oct. 22, 2002

(54) APPARATUS FOR DISPLAYING A SUSPENDED IMAGE

(75) Inventors: John Graham Holden, Hemel Hempsted (GB); Susan Styles, Hillingdon (GB)

(73) Assignee: Central Research Laboratories Limited, Hayes (GB)

( * ) Notice: Subject to any disclaimer, the term of this patent is extended or adjusted under 35 U.S.C. 154(b) by 0 days.

(21) Appl. No.: 09/701,733

(22) PCT Filed: May 28, 1999

(86) PCT No.: PCT/GB99/01716

§ 371 (c)(1),
(2), (4) Date: Jan. 23, 2001

(87) PCT Pub. No.: WO99/63391

PCT Pub. Date: Dec. 9, 1999

(30) Foreign Application Priority Data

Jun. 3, 1998 (GB) .............................................. 9811780

(51) Int. Cl.⁷ .......................... G02B 5/124; G02B 3/08; G02B 27/00
(52) U.S. Cl. ....................... 359/530; 359/629; 359/529; 359/742
(58) Field of Search ................................. 359/529–530, 359/534–543, 546, 618, 629, 638–640, 741, 743

(56) References Cited

U.S. PATENT DOCUMENTS 5,764,411 A * 6/1998 Shanks ........................ 359/483
6,204,973 B1 * 3/2001 Holden ........................ 359/629

* cited by examiner

Primary Examiner—James Phan
(74) Attorney, Agent, or Firm—William H. Bollman

(57) ABSTRACT

The apparatus comprises an object for display, a retro-reflector receiving light from the object, a beam-splitter in a path for light from the object to the retro-reflector, and a Fresnel lens (having no point of central symmetry) between the beam-splitter and the retro-reflector. The beam-splitter makes an oblique angle to the direction of propagation of the light, such that it transmits some light and reflects the rest. Light from the beam-splitter passes through the lens to the retro-reflector, which reflects it back through the lens to the beam-splitter. This retro-reflected light is reflected and/or transmitted by the beam-splitter to form a real image suspended in space. The type of Fresnel lens used in the apparatus improves viewability because unwanted reflections from the surfaces of the lens are shifted such that they are no longer visible when viewing the suspended image.

13 Claims, 3 Drawing Sheets

APPARATUS FOR DISPLAYING A SUSPENDED IMAGE

TECHNICAL FIELD

The present invention relates to an apparatus for displaying an image suspended in space.

BACKGROUND ART

Suspended images may be used, for example, as an aid to visualisation during laparoscopic (keyhole) surgery. The potential benefits of keyhole surgery are, on rare occasions, undermined by complications following certain keyhole procedures. A reason for this is the misinterpretation of the anatomy of the patient seen via a standard TV, or video monitor, as a twodimensional (2D) image. Another problem is that the monitor only allows the surgeon a "look-up" instead of a "gaze-down" position. This results in the surgeon no longer being able to see his hands while looking at the 2D image displayed on the monitor. It is therefore advantageous to suspend an image in space above the patient, enabling the surgeon to work in the preferred "gaze-down" position.

Apparatus for displaying an image suspended in space, which may be used for keyhole surgery, is disclosed in PCT/GB98/00186 and European Patent No. EP 0460 873 (Thorn EMI plc). The former apparatus comprises an object for display, a retro-reflector, a beam-splitter, and a converging optical element. The converging optical element may comprise a Fresnel lens.

A Fresnel lens generally has a micro-structured surface on one side, and a flat or smooth surface on the other, as shown in FIGS. 1 and 2. The micro-structured surface consists of a series of grooves (22) with changing slope angles as the distance from the optical axis increases. The grooves are arranged in concentric circles, the circles having a point of central symmetry (26).

The use of a Fresnel lens in a suspended image system gives rise to unwanted images formed by reflections from the surfaces of the lens. Two types of reflections are formed: those from the grooved surface ('floating reflections'), and those from the flat or smooth surface ('fixed reflections'). Reflections from the grooved surface of the Fresnel lens (which is normally situated facing the object to be displayed) give rise to a virtual image of the object. Reflections from the flat or smooth surface of the lens give rise to a real image (28) of the object. These reflected images are formed in addition to the image of the object formed by the refraction of light from the Fresnel lens.

Suspended image systems may be used for applications in which the presence of these reflected images is very distracting, as, for example, in keyhole surgery. Application of anti-reflective coatings to the Fresnel lens can significantly reduce the visibility of these unwanted images. However, such coatings can be very expensive and difficult to apply, particularly to the grooved surfaces of the lens. The coatings may also cause colour shifts in the suspended image.

An aim of the present invention is to improve the viewability of a suspended image by shifting the position of the reflected images such that they are no longer visible when viewing the suspended image.

DISCLOSURE OF INVENTION

According to a first aspect of the invention there is provided apparatus for displaying a suspended image comprising: an object for display; a first retro-reflector being arranged to receive light from the object; a beam-splitter in a path for light from the object to the first retro-reflector, the beam-splitter being arranged at an oblique angle to the direction of propagation of the light such that it transmits part of the light and reflects part of the light, the light being transmitted or reflected by the beam-splitter is received by the first retro-reflector and is reflected by it back to the beam-splitter, which either reflects or transmits part of this retro-reflected light, to form a real image suspended in space; a converging optical element arranged between the beam-splitter and the first retro-reflector such that in use light from the beam-splitter passes through the converging optical element to the first retro-reflector, which reflects it back through the optical element towards the beam-splitter, characterised in that the converging optical element comprises a Fresnel lens having a substantially flat or smooth surface and a grooved surface, the arrangement of grooves of the grooved surface having no point of central symmetry.

A further retro-reflector may be provided to receive light being reflected by the beam-splitter from the object, such that part of the light being reflected from both retro-reflectors forms the real image suspended in space.

A further Fresnel lens may be provided in the path of light from the beam-splitter to the further retro-reflector. Preferably the Fresnel lens or lenses is/are located such that they form an image of the given object or image at the retro-reflector(s).

The Fresnel lens(es) may comprise an array of smaller Fresnel lenses, each smaller Fresnel lens having no point of central symmetry. The array of smaller Fresnel lenses collects the light which would have been collected by the single Fresnel lens. The individual lenses of the array may all face the beam-splitter so that they share a common focal plane. The focal length of such "tiled" lenses can be made very short—of the order of one or two centimeters—which enables the lens and the retro-reflector to be placed close together. This allows the apparatus to be more compact. Such lens arrays combine good quality optical performance, a large area over which to gather light, and a short focal length compared with the lateral dimension of the light gathering area.

Preferably at least one surface of the Fresnel lens (or lenses) is coated with an anti-reflective coating in order to render the fixed reflection of the object substantially invisible to a viewer.

The object to be displayed may be an image being displayed by a visual display unit. Alternatively, an illuminated solid object may be used in place of the visual display unit.

The retro-reflector(s) may be composed of an array of very small, or micro, retro-reflectors. The individual retro-reflectors may be of the order of 100 μm. The retro-reflector(s) may comprise a sheet of bead type retro-reflective material. Alternatively, the retro-reflective material may comprise a sheet of a corner cube retro-reflector material, a triple mirror retro-reflector, or other direction selective screen.

According to a further aspect of the invention, the retro-reflector(s) may be replaced by a specularly reflective surface which forms a real or virtual image suspended in space depending upon the distance between the object and the converging optical element. Alternatively, a layer such as a mirror (e.g. plane, parabolic or spherical) may be used in place of the retro-reflector(s). The specularly reflective surface or layer may be partly light transmissive, or opaque, and may be curved or flat.

Preferably the beam-splitter makes an angle of between 35 and 55 degrees to the direction of propagation of light from the object to the first retro-reflector or specularly reflective surface.

Suspended images having the best resolution are formed when the optical distances between the object and the converging lens, and the converging lens and the retro-reflector, are selected so that the converging lens produces an image of the object on or at the surface of the retro-reflector. The apparatus is therefore preferably arranged such that the distance between the retro-reflector(s) or specularly reflective layer and the converging optical element(s) is selectable.

BRIEF DESCRIPTION OF DRAWINGS

The invention will now be described, by way of example only, with reference to the accompanying Figures, in which.

BEST MODES FOR CARRYING OUT THE INVENTION

Figure 1:
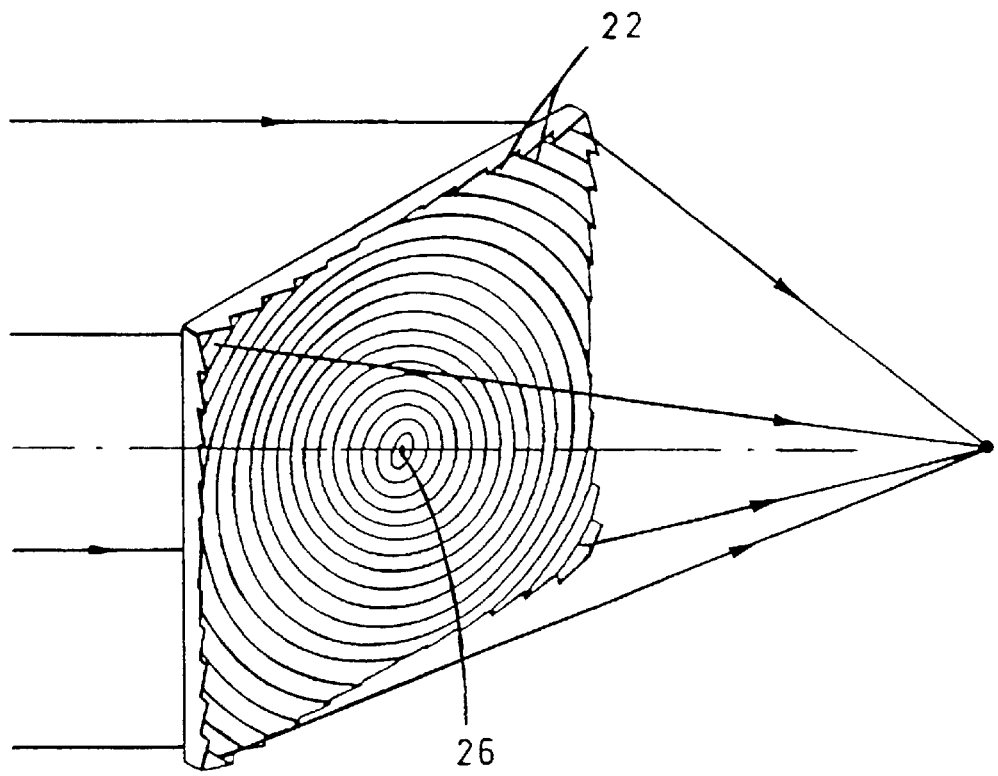
FIG. 1 is a schematic isometric view of a Fresnel lens having a point of central symmetry.
Figure 2:
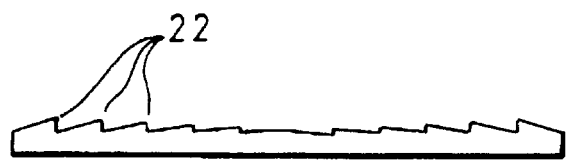
FIG. 2 is a schematic sectional view of a Fresnel lens.
Figure 3:
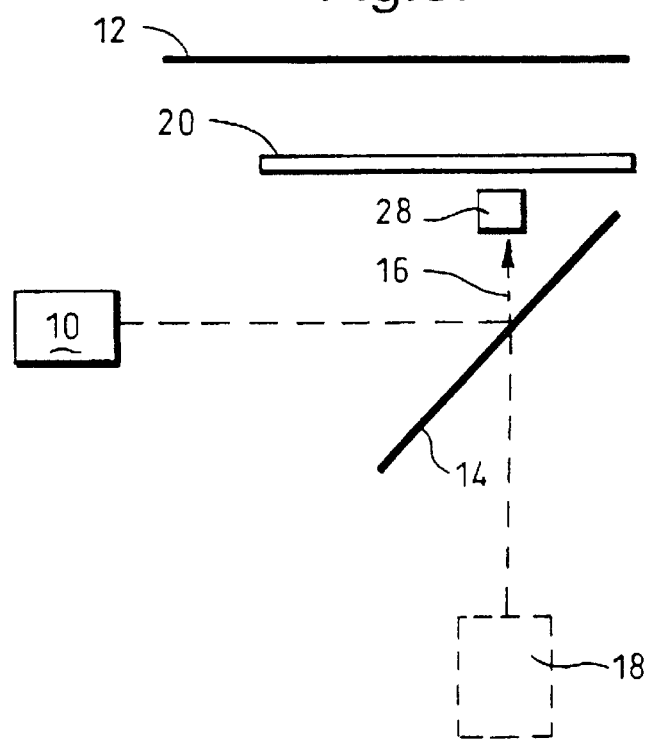
FIG. 3 shows an apparatus for displaying a real image suspended in space according to the invention.

Referring to FIG. 3 there is shown an apparatus according to the invention for displaying a real image suspended in space. The apparatus includes an object (10) to be displayed; a retro-reflector (12) being arranged to receive light from the object (10), and a beam-splitter (14) in a path of light (16) from the object (10) to the retro-reflector (12). The beam-splitter (14) is arranged at an oblique angle to the direction of propagation of the light such that it reflects part of the light. The light reflected by the beam-splitter (14) is received by the retro-reflector (12) and is retro-reflected by it back to the beam-splitter. Part of the retroreflected light is then transmitted by the beam-splitter (14) to form a real image (18) suspended in space.

The apparatus further comprises a converging lens (20) arranged between the beam-splitter (14) and the retro-reflector (12) such that light from the beam-splitter passes through the lens (20) to the retro-reflector which retro-reflects it back through the lens towards the beam-splitter.

Figure 4:
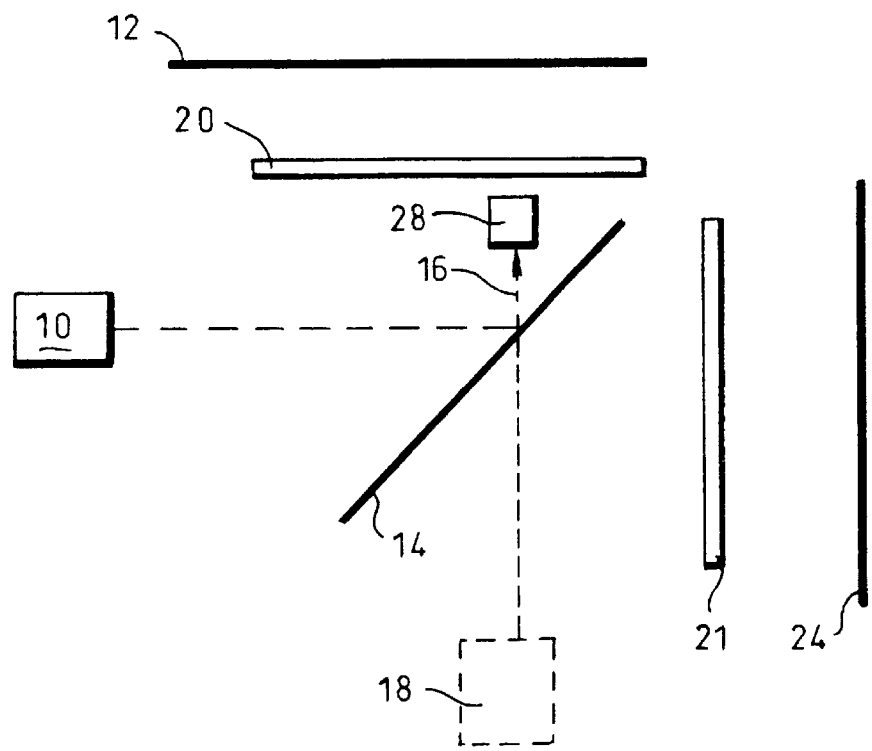
FIG. 4 shows an apparatus for displaying a real image suspended in space according to the invention.

In an alternative arrangement (shown in FIG. 4), two sheets of retro-reflective material (12, 24) are provided, and respective converging lenses (20, 21) are arranged between the beam-splitter (14) and each retro-reflector (12, 24). This arrangement reduces the amount of light lost and therefore increases the apparent brightness of the suspended image.

It is believed the reason that the presence of a converging optical element (20, 21) such as a lens is advantageous, is that contrary to simple theory, a ray of light incident on a small retro-reflector will not be returned precisely along the direction from which it came. This is due to diffraction effects, manufacturing tolerances, translational shifts, or other causes of imperfect retro-reflection. As a result, the incident ray becomes a narrow cone of light after retro-reflection. If one places a converging lens in the path of this cone of light, the light will behave as if it had originated at a point source, and the lens will brine the cone of light to a focus.

If the lens (20, 21) is positioned such that it forms an image of the object (10) at the surface of the retro-reflector (12, 24), then the point at which the same lens will form an image of the point source from the cone of retro-reflected light will coincide with the position of the original object (or where a beam-splitter diverts the light at the position of the suspended image). The lens thus provides a dramatic sharpening of the suspended image (18). The improvement is such that bead retro-reflectors (which do not retro-reflect perfectly and usually give rise to poor quality suspended images) can be used to form suspended images showing resolutions of TV quality.

Figure 5:
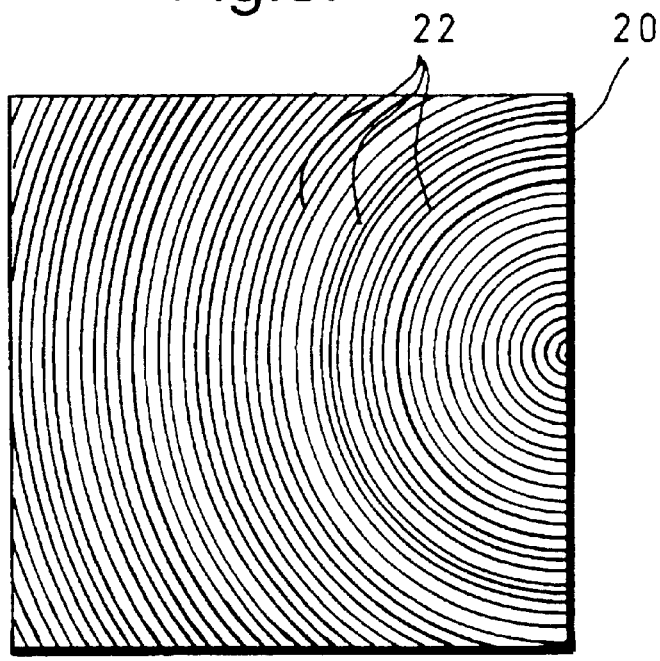
FIG. 5 shows a schematic plan view of a Fresnel lens having no point of central symmetry.
Figure 6:
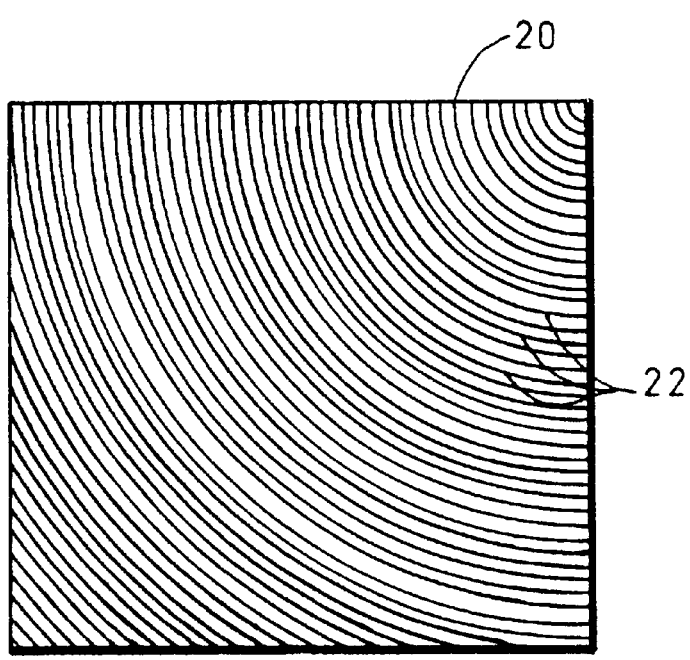
FIG. 6 shows a schematic plan view of a further Fresnel lens having no point of central symmetry.

The converging lens (20, 21) used in the invention is a Fresnel lens, wherein the grooves (22) of the lens (20, 21) have no point of central symmetry. Examples of such lenses are shown in FIGS. 5 and 6, and constitute a normal Fresnel lens cut in half, or a smaller portion of the lens such as a quarter, or a third. The use of such Fresnel lenses (20, 21) is advantageous as it reduces the number of unwanted reflections from the grooved surface by removing them from the line of sight of the viewer.

What is claimed is:

1. Apparatus for displaying an image suspended in space, comprising:

an object for display;

a first retro-reflector being arranged to receive light from the object;

a beam-splitter in a path for light from the object to the first retro-reflector, the beam-splitter being arranged at an oblique angle to the direction of propagation of the light such that it transmits part of the light and reflects part of the light, the light being transmitted or reflected by the beam-splitter is received by the first retro-reflector and is reflected by it back to the beam-splitter, which either reflects or transmits part of this retro-reflected light, to form a real image suspended in space;

a converging optical element arranged between the beam-splitter and the first retro-reflector such that in use light from the beam-splitter passes through the converging optical element to the first retro-reflector, which reflects it back through the optical element towards the beam-splitter, characterized in that the converging optical element comprises a Fresnel lens having a substantially flat or smooth surface and a grooved surface, the arrangement of grooves of the grooved surface having no point of central symmetry.

2. Apparatus as claimed in claim 1 wherein the first retro-reflector is provided to receive light being reflected by the beam-splitter from the object and a further retro-reflector is provided to receive light being transmitted by the beam-splitter from the object, such that part of the light being reflected from both retro-reflectors forms the real image suspended in space.

3. Apparatus as claimed in claim 2 wherein a Fresnel lens is provided in the path of light from the beam-splitter to both the first and the further retro-reflector.

4. Apparatus as claimed in claim 1 wherein the Fresnel lens is located such that it forms an image of the given object or image at the retro-reflector.

5. Apparatus as claimed in claim 1 wherein the Fresnel lens comprises an array of Fresnel lenses each having no central point of symmetry.

6. Apparatus as claimed in claim 5 wherein the array of Fresnel lenses share a common focal plane.

7. Apparatus as claimed in claim 1 wherein at least one surface of the Fresnel lens is coated with an anti-reflective coating.

8. Apparatus as claimed in claim 1 wherein the object is an image being displayed by a visual display unit.

9. Apparatus as claimed in claim 1 wherein the retro-reflector is a bead retro-reflector.

10. Apparatus as claimed in claim 1 wherein the retro-reflector is a triple mirror retro-reflector.

11. Apparatus as claimed in claim 1 wherein the retro-reflector is a corner-cube retro-reflector.

12. Apparatus as claimed in claim 1 wherein the beam-splitter makes an angle of between 35 and 55 degrees to the direction of propagation of light from the object to the first retro-reflector.

13. Apparatus as claimed in claim 1 wherein the distance between the Fresnel lens and the retro-reflector is selectable.

* * * * *